Oct. 6, 1953                H. C. WENDT                2,654,254
                    CAGING DEVICE FOR GYROSCOPES
                        Filed July 20, 1949
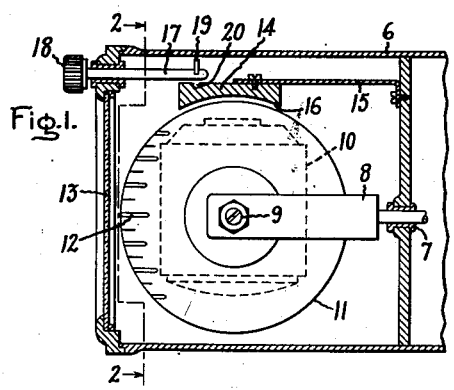
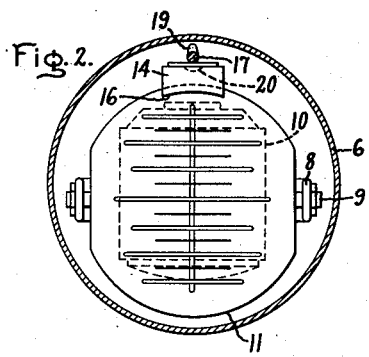
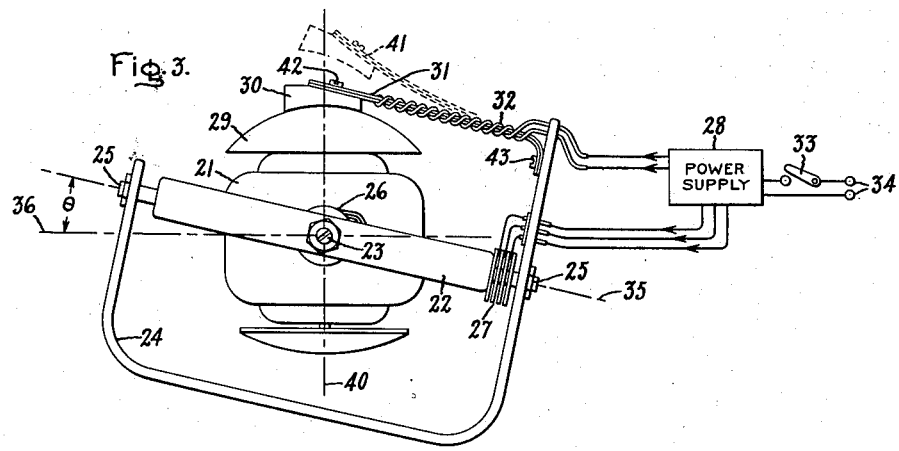
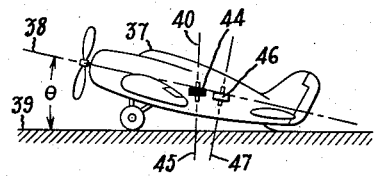
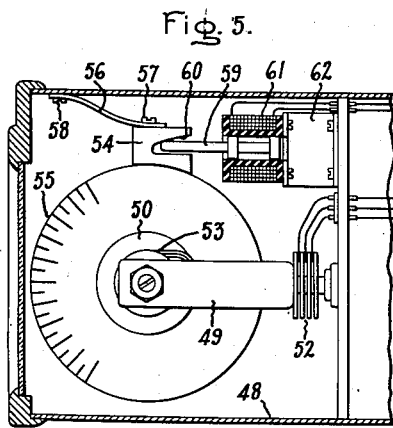
Inventor:
Harry C. Wendt,
by *Prowell & Mack*
His Attorney.

Patented Oct. 6, 1953

2,654,254

UNITED STATES PATENT OFFICE 2,654,254

CAGING DEVICE FOR GYROSCOPES

Harry C. Wendt, Lynnfield, Mass., assignor to General Electric Company, a corporation of New York Application July 20, 1949, Serial No. 105,769

12 Claims. (Cl. 74—5.1)

1

The present invention relates to gyroscope caging mechanisms and, more specifically, to arrangements for caging and rapidly orienting gyroscopic instruments.

Particularly advantageous utilization of the subject invention is made in conjunction with gyroscopes employed on aircraft to provide indications of and control of the craft flight attitudes. Those skilled in the art fully appreciate that the time elapsing between the start of rotation of a gyro rotor and the time when the instrument may be depended upon to provide an accurate and stable reference on an aircraft is of such duration that the instrument often cannot be used as a reference during take-off or for periods thereafter, especially on present aircraft which may be airborne within a very short time after starting of the craft engine. Further, the rotor accelerations encountered during the starting interval of a gyro may seriously disturb the instrument when it is not spinning at a rate sufficient to create high stability, and, following de-energizing of a gyro rotor motor, as upon landing of the supporting craft, the spin axis may drift from its proper orientation and may be displaced by changes in the craft attitude on the ground.

Non-pendulous gyro horizon-type instruments cannot be effectively employed without continuously-operating erecting components which direct the gyro spin axis radially to the earth's center, and pendulous horizon gyros are rendered inaccurate by acceleration forces acting thereon. In accordance with this invention, however, the axis of spin of both pendulous and non-pendulous gyro instruments may be rapidly and accurately oriented, wandering of the spin axis of any gyro following cessation of rotor motor excitation may be eliminated, and torques encountered upon the acceleration and deceleration of rotor rotation may be prevented from influencing the spin axis and gimbal orientations. These advantages obtain from the arrangement wherein a holding member is brought into contact with the rotor frame to maintain the frame in fixed relationship therewith. This caging system is distinguished from conventional caging mechanisms, which position the rotor axis and gimbals to assume the predetermined relationship with respect to the instrument casing which exists when the craft is in a normal flight attitude, in that the system operates to maintain that orientation between the gyro and its casing which exists when caging is accomplished. Thus, when the supporting aircraft has landed, the

2 gyro may be caged in its stabilized position and will be held in that position when rotor excitation is not supplied. Upon re-application of the rotor excitation, the rotor frame is still fixedly positioned by the holding member, and accelerating torques will not disturb the instrument. After sufficient rotor speed to preserve a desired degree of stability has been realized, the holding member may release the rotor frame, which is still in its stabilized or fully-erected attitude, and the aircraft may become airborne with immediate and full reliance upon the gyro instrument. Caging and uncaging of a gyro constructed in conformity with the present invention may be performed manually, but, as the further description herein indicates, entirely automatic, rapid, and positive-operating mechanisms are preferably utilized to accomplish the unique results made possible by this invention.

It is therefore one object of the subject invention to provide an improved gyroscope caging arrangement which maintains the gyroscope in a stabilized attitude.

A further object is to provide an arrangement, for use with gyro instruments, which cages the gyroscope in a stabilized attitude and renders the instrument suitable for reference use within a very short period after excitation thereof.

Still further, an object is to provide devices for uniquely caging and uncaging gyroscopes and for rapidly establishing as references fully erected bank and climb gyros and fully synchronized and stabilized directional gyro instruments.

Other objects and features of the invention may be observed with reference to the following description and the accompanying drawings, wherein:

Fig. 1 is a pictorial view, with parts broken away, of a gyroscopic instrument including a manually-operated caging device in accord with this invention;

Fig. 2 illustrates a sectional view of the instrument of Fig. 1;

Fig. 3 represents a gyro vertical instrument, including the caging mechanism of this invention as actuated by a bimetallic strip member;

Fig. 4 depicts an aircraft in a landed position together with schematic representations of the rotor orientations produced by conventional caging mechanisms and those constructed in the manner taught by the present invention; and Fig. 5 is a partially pictorial and schematic representation, with parts in section, of an electrically-actuated caging mechanism incorporating a time delay.

In Fig. 1, a gyro direct-indicating type instrument, which might comprise either a directional or bank and climb gyro, is shown enclosed within an instrument frame 6 which additionally serves as an outer gimbal structure pivotally supporting, by bearing 7, the yoke-shaped inner gimbal 8. Bearings 9 rotatably position the gyro frame 10 within the gimbal 8, this frame being illustrated in part in phantom view and encasing the gyro rotor and apparatus for spinning this rotor, not shown. A substantially spherical surface member 11 is attached to the gyro frame and is employed both as the background for the indicia 12 thereon and as a cooperating element of the subject caging arrangement. The instrument window 13 renders the gyro indicia visible to an observer.

Caging of the gyro of Fig. 1 is accomplished by manual actuation of a holding member 14 such that this member, normally held out of engagement with the spherical surface member 11 by the resilient coupling member 15 connected therewith and with instrument frame 6, is forced into frictional contact with the member 11. Insurance of adequate frictional holding of the member 11 and the rotor frame 10 attached thereto is provided by the spherical surface coating 16 which is applied to a part of holding member 14 and which may constitute any material having the desired characteristics, such as rubber. The manually-operated arrangement for actuating the holding member is represented by shaft 17 projecting through the instrument frame and secured to knob 18. A key, 19, attached to the shaft 17 on the interior of the frame, projects therefrom a distance sufficient to press member 14 into engagement with spherical member 11 when the knob and shaft are rotated through 180 degrees from the position shown. Preferably, a slot 20 in holding member 14 receives this key, and is shaped such that the key and slot tend to maintain a meshed position once this has been established. Fig. 2, taken along section line 2—2 of Fig. 1, presents further details of this instrument.

When the gyroscope of Figs. 1 and 2 is employed as a horizon indicator, the rotor frame will be erected to the true vertical during flight and will maintain this stable attitude when the aircraft has landed. Upon de-energizing of the motor for spinning the gyro rotor, an uncaged horizon gyro might drift from this attitude, and, further, caging of the instrument by conventional devices would force the spin axis to assume an attitude 90 degrees removed from the gimbal lock position, which would not be coincident with the true vertical when the longitudinal axis of the craft and the instrument is not horizontal due to the inclined stationary attitude of the craft upon the ground. The holding arrangement of Figs. 1 and 2 overcomes these disadvantages by engaging and firmly holding the rotor frame in whatever relative orientation to the instrument frame or outer gimbal structure it may bear when the caging is accomplished. Therefore, when the supporting aircraft has landed and its longitudinal axis is displaced from the horizontal, the caging arrangement will engage and hold the rotor frame and spin axis at the true vertical and the rotor may be allowed to cease rotation.

The re-application of power to bring the gyro rotor up to speed when the craft is to be airborne again introduces accelerating torques which tend to disturb the spin axis attitude, especially where the rotor is brought up to normal speed very rapidly so that the instrument may be relied upon during take-off. However, the caging arrangement of this invention holds the gyro in the erected position during the motor starting period, and release of the rotor frame by the holding member just before take-off finds the rotor at a speed sufficient to preserve stability and fully erected to the vertical such that the instrument indications are immediately accurate.

Preferred embodiments of the subject invention are those which automatically perform the unique caging and uncaging and at the proper times. One such embodiment appears in Figure 3 wherein a horizon-type gyro is shown to include the rotor casing or gyroscope frame 21, within which is journalled a rotor, not shown, inner gimbal 22 supporting this frame by pivots 23, and the outer gimbal structure or instrument frame 24 supporting the inner gimbal by pivots 25. Slip rings 26 and 27 are provided for coupling three phase excitation to a rotor motor, not shown, within the casing 21, from a power supply 28. A portion of the outer casing surface comprises a substantially spherically-shaped surface member 29 with which the holding member 30 may cooperate to cage the instrument. The holding member 30 is coupled with the gimbal structure or frame 24 by a bimetallic strip member 31, the shape of which is temperature-responsive. Wound about the strip 31, but electrically insulated therefrom by an insulating coating, is the electrical heating coil 32 which also receives its excitation from the power supply 28. Coil 32 comprises an electrical heating means for heating and moving the bimetallic strip 31 and the attached holding member 30. Suitable means, such as switch 33, control the excitation of power supply 28 from the electrical power terminals 34, and constitute a control for the simultaneous energizing and de-energizing of the heating means and rotor motor.

The installation of the horizon-type gyro of Fig. 3 in an aircraft would align the inner gimbal axis 35 substantially parallel with the longitudinal axis of the craft, and this axis would be at an angle $\theta$ with the horizontal 36 when the supporting aircraft is at rest upon the ground. In Fig. 4, an aircraft 37 is represented in such an attitude with its longitudinal axis 38 at angle $\theta$ with the earth's surface 39. When the craft has landed after a flight during which the gyro spin axis has been maintained along a vertical such as 40 in Figs. 3 and 4, the control switch 33 would be opened, thus de-energizing both the rotor motor and heating coil 32. At that time the bimetallic strip 31 and holding member 30 would be in the raised position indicated by dotted lines 41 in Fig. 3. Upon cooling of the strip after a predetermined period following the de-energizing of the coil 32, the strip would straighten out and force the holding member attached to it by screw 42 to firmly engage the spherical surface member 29 of the rotor frame. The opposite end of the strip is attached to the gimbal structure 24 by screw 43, and locking of the spin axis attitude with respect to that of the outer gimbal structure occurs. Thereafter, until the holding member releases the member 29, the caged gyro cannot be caused to depart from this locked attitude. Rotor 44 in Fig. 4, illustrative of the rotor within casing 21, is therefore aligned with the vertical 45. Conventional caging mechanisms would force a rotor such as 46 to maintain alignment with an axis 47 not coincident with the true vertical, as previously explained. Preferably, the bimetallic strip is designed such that ambient temperatures within the instrument will not influence the actuation of the holding member. It should be recognized that the speed of operation of a bimetallic strip in causing the holding member to engage and disengage the rotor frame is sufficiently long with respect to the motor starting interval and sufficiently short with respect to the motor coasting interval such that the described advantages of the subject invention readily obtain.

Starting of the gyro rotor by closing control switch 33 simultaneously energizes the heating coil 32. However, due to the time delay which may be secured with bimetallic strip and heating coil combinations, the holding member 30 may be moved out of engagement with the rotor frame 21 only after a predetermined interval following the energizing of coil 32. This predetermined interval is preferably selected to allow the gyro rotor to experience all high starting torques within that time. After sufficient heating of the strip has been achieved, it will bend to the position shown by dotted lines 41, and the rotor frame will be freed to indicate craft attitudes relative thereto. With known high-speed rotor accelerating motors, the entire uncaging sequence may be designed to occur prior to a change in the attitude of the craft's longitudinal axis with reference to the horizontal when the craft is to be airborne, and the gyro instrument, uncaged and fully erected to the true vertical, may be relied upon during take-off.

The automatic caging and uncaging arrangement of Fig. 5 produces similar results. In that embodiment, instrument frame 48 serves as an outer gimbal structure for the inner gimbal 49 and the rotor frame 50. Excitation for the motor spinning the rotor journalled within frame 50 is derived from power supply 51 and conducted by way of slip rings 52 and 53. Holding member 54 is biased towards engagement with the spherical surface member 55 of frame 50 by the spring 56 attached thereto and to instrument frame 48 by screws 57 and 58 respectively, and the solenoid plunger 59 forces holding member 54 out of engagement with surface member 55 by bearing against the surface of the recess 60 in member 54 when the solenoid coil 61 is energized by power supply 51. Solenoid coil 61 is coupled with the instrument frame 48 by a bracket 62.

A time delay system 63 is interposed between the power supply and solenoid coil 61 to accomplish a delayed actuation of plunger 59 and movement of holding member 54 following energizing of the gyro motor by the closure of control switch 64 coupling the power supply to power terminals 65. With this arrangement, the gyro rotor may be allowed to reach a desired speed before uncaging of the instrument obtains. Delay system 63 may comprise any suitable electronic, mechanical, or electro-mechanical arrangement for accomplishing the desired delay in the actuation of the solenoid 61, and a thermal time delay relay would be a convenient device for this purpose.

Although the discussion of the subject invention has proceeded with particular reference to preferred embodiments thereof, it should be apparent to those skilled in the art that there are many modifications thereof which may be made without departure from the principles and scope of this invention. By way of example, manual actuation of the caging system may be obtained by axial rather than rotative movement of the caging knob and, in fact, many known mechanical arrangements for actuating the caging mechanism may be substituted for that shown without the exercise of inventive faculties. An entirely mechanical time delay in the actuation of the holding member may be achieved by such devices as a dashpot and linkage members, and these devices may be responsive to manual or electrically-operated mechanisms. As described, automatic uncaging is obtained when excitation is applied simultaneously to both the gyro motor and actuating device, but obviously the arrangement may be altered such that the same result obtains when a control switch de-energizes the actuating device at the same time that the motor is energized. Also, the shapes and construction of the holding member and rotor frame surface member may be modified to have appearances other than those illustrated.

It should be clear that the particular arrangements which have been disclosed as embodying this invention are susceptible to numerous modifications and adaptations without departing from the scope of this invention as indicated by the accompanying claims.

What I claim as new and desire to secure by Letters Patent of the United States, is:

1. A gyroscopic instrument comprising a gyro rotor frame having a substantially spherical caging surface thereon, a gyro rotor journalled in said frame for rotation in relation to said frame and caging surface, means for rotating said rotor, an inner gimbal supporting said frame for movement about two axes, an outer gimbal supporting said inner gimbal, a holding member for contacting said frame caging surface in a holding engagement, means mounting said holding member on said outer gimbal structure out of engagement with said caging surface, and means for actuating said holding member into holding engagement with said frame caging surface.

2. A gyroscopic instrument comprising a rotor casing having a substantially spherical surface thereon, a gyro rotor journalled in said casing for rotation in relation to said casing and surface, means for spinning said rotor, a gimbal supporting said casing for oscillation about mutually perpendicular axes, an instrument frame pivotally supporting said gimbal, a holding member supported on said instrument frame out of engagement with said rotor casing surface, and actuating means for moving said holding member into holding engagement with said rotor casing surface.

3. A gyroscopic instrument comprising a casing having a substantially spherical surface area thereon, a rotor journalled in said casing for rotation in relation to said casing and surface area, means for spinning said rotor, a gimbal supporting said casing for oscillation about two mutually perpendicular axes, an instrument frame pivotally supporting said gimbal, a holding member coupled with said instrument frame out of engagement with said casing surface area, said member being adapted to engage and hold said spherical surface area and said casing in the fixed relationship with said frame which exists when said member is actuated, and a manually-operated device for actuating said holding member to engage and hold said spherical area and casing.

4. A gyroscopic instrument comprising a casing having a substantially spherical surface thereon, a rotor journalled in said casing, means for spinning said rotor, a gimbal supporting said casing for oscillation about two axes, an instrument frame pivotally supporting said gimbal, a temperature-responsive bimetallic strip member having one end coupled with said frame and the opposite end adapted to engage and hold said casing surface, thermal means for heating said bimetallic member and moving said opposite end of said member to and from holding engagement with said casing surface, and means for energizing and de-energizing said thermal means.

5. In combination, a gyroscope frame having a substantially spherical surface thereon, a gyro rotor journalled in said frame, electrical means for rotating said gyro rotor, a gimbal supporting said frame for movements about two mutually perpendicular axes, a structure pivotally supporting said gimbal, a temperature-responsive bimetallic strip member having one end coupled with said structure, a holding member coupled to the other end of said bimetallic member and adapted to engage and hold said spherical surface and frame when in contact therewith, electrical heating means positioned to accomplish heating of said bimetallic member, and means for controlling the electrical power supply to said rotating means and said heating means, said holding means being freed of engagement with said surface when one control of the electrical power supply to said heating member is established and being brought into engagement with said surface when another control is established.

6. In combination, a gyroscope frame having a substantially spherical surface thereon, a gyro rotor journalled in said frame, electrical means for rotating said gyro rotor, a gimbal supporting said frame for movements about two mutually perpendicular ones, a structure pivotally supporting said gimbal, a temperature-responsive bimetallic strip having one end coupled with said structure, a holding member coupled to the other end of said strip and adapted to engage and hold said surface and frame when in contact therewith, electrical heating means positioned to heat said strip upon energizing thereof, said bimetallic strip and holding member being disposed to hold said frame when said strip is unheated and to permit movement of said frame when said strip is heated beyond a predetermined temperature, and control means for simultaneously energizing and de-energizing said rotating means and said heating means.

7. The combination as set forth in claim 6, wherein said bimetallic strip and said heating means are arranged such that the time delay between the energizing of said heating means and the releasing of said frame by said holding means permits said rotating means to rotate said rotor without torques of magnitudes sufficient to disturb said gyroscope.

8. In combination with a gyroscope instrument having a rotor frame, a rotor mounted in said frame, an electric motor for rotating said rotor, an inner gimbal pivotally supporting said frame about one axis, and an outer gimbal structure pivotally supporting said gimbal about another axis, the caging arrangement comprising a substantially spherical caging member affixed to said rotor frame, a holding member supported on said outer gimbal, electrically-operated apparatus for locking said holding member with said caging member, thereby effecting locking of said rotor frame with said outer gimbal structure in whatever relative position exists therebetween when said apparatus is operated, control means for simultaneously controlling the electrical power supply to said apparatus and to said motor, said apparatus and control means being arranged such that said apparatus automatically locks said frame and gimbal structure when said motor is de-energized and unlocks when said motor is energized.

9. The combination as set forth in claim 8, further comprising time delay means associated with said apparatus and control means for maintaining the locked positions of said frame and said outer gimbal structure for a predetermined period following the energizing of said motor.

10. A gyroscopic instrument comprising a rotor frame having a substantially spherical caging surface thereon, a gyro rotor journalled in said frame, means for spinning said rotor in relation to said frame and caging surface, a gimbal supporting said frame for rotation about two axes, a structure pivotally supporting said gimbal, a holding member coupled with said structure and adapted to engage and hold said frame caging surface in the fixed relationship with said structure which exists when said member engages said frame caging surface, biasing means forcing said holding member into engagement with said frame caging surface, electrically-operated means for moving said member out of engagement with said frame caging surface, and control means for simultaneously controlling the energizing and de-energizing of said electrically-operated means and said spinning means.

11. A gyroscopic instrument as set forth in claim 10 further comprising time delay means cooperating with said electrically-operated means for maintaining said holding member in engagement with said frame caging surface for a predetermined period following the energizing of said spinning means.

12. A gyroscopic instrument according to claim 10 wherein said electrically-operated means comprises a coil for establishing a magnetic field and an armature member responsive to said magnetic field for moving said holding member.

HARRY C. WENDT.

References Cited in the file of this patent

UNITED STATES PATENTS

| Number | Name | Date |
|---|---|---|
| 2,297,265 | Manteuffel | Sept. 29, 1942 |
| 2,366,721 | Gabrielson | Jan. 9, 1945 |
| 2,422,267 | Summers | June 17, 1947 |
| 2,450,320 | Wendt | Sept. 28, 1948 |
| 2,524,553 | Wendt | Oct. 3, 1950 |
| 2,555,981 | Lynch et al. | June 5, 1951 |